US009235735B2

(12) United States Patent
Peters et al.

(10) Patent No.: US 9,235,735 B2
(45) Date of Patent: Jan. 12, 2016

(54) CARD READER DEVICE FOR CONTACTLESS READABLE CARDS AND METHOD FOR OPERATING SAID CARD READER DEVICE

(75) Inventors: Florian Peters, Montréal (CA); Duraipandianadar Balasubramanian, Chennai (IN)

(73) Assignees: BUNDESDRUCKEREI GMBH, Berlin (DE); IDENTIVE TECHNOLOGIES (INDIA) PVT LTD, Chennai (IN)

(*) Notice: Subject to any disclaimer, the term of this patent is extended or adjusted under 35 U.S.C. 154(b) by 792 days.

(21) Appl. No.: 13/202,587

(22) PCT Filed: Feb. 19, 2010

(86) PCT No.: PCT/EP2010/001059
§ 371 (c)(1),
(2), (4) Date: Sep. 8, 2011

(87) PCT Pub. No.: WO2010/094497
PCT Pub. Date: Aug. 26, 2010

(65) Prior Publication Data
US 2011/0309913 A1    Dec. 22, 2011

(30) Foreign Application Priority Data
Feb. 20, 2009   (DE) .......................... 10 2009 009 846

(51) Int. Cl.
*G06K 7/00* (2006.01)
*G06K 7/10* (2006.01)
(Continued)

(52) U.S. Cl.
CPC .......... *G06K 7/0008* (2013.01); *G06K 7/10198* (2013.01); *G06K 7/10336* (2013.01); *G08B 13/2471* (2013.01); *H01Q 1/2216* (2013.01); *H04B 5/0037* (2013.01)

(58) Field of Classification Search
CPC ............ G06K 7/0008; G06K 7/10198; G06K 7/10336; G08B 13/2471; H04B 5/0037; H01Q 1/2216
USPC ............................... 340/10.1, 10.2, 10.3, 10.4
See application file for complete search history.

(56) References Cited

U.S. PATENT DOCUMENTS 3,634,884 A * 1/1972 Ross ............................. 342/28
4,219,810 A * 8/1980 Joosten ......................... 367/76
(Continued)

FOREIGN PATENT DOCUMENTS

CN    101080729 A    11/2007
CN    101313341 A    11/2008
(Continued)

OTHER PUBLICATIONS

Amplitude Shift Keying, Dec. 2008, Wikipedia.*
(Continued)

*Primary Examiner* — Quang D Pham
(74) *Attorney, Agent, or Firm* — Laurence Greenberg; Werner Stemer; Ralph Locher

(57) ABSTRACT

A card reader device is configured to carry out communication with a contactless readable card according to standard ISO/IEC 14443 type B. In order to provide that a modulation index, which self-adjusts in close range in a presence of a contactless readable card, corresponds to a desired specified modulation index, the magnetic field is received and evaluated via a reception antenna of the card reader device. The modulation index is controlled or regulated accordingly in case of deviations between a measured modulation index and a specified value for the modulation index in order to approximate the measured modulation index to the specified value.

17 Claims, 4 Drawing Sheets

(51) Int. Cl.
  *H04B 5/00* (2006.01)
  *H01Q 1/22* (2006.01)
  *G08B 13/24* (2006.01)

(56) References Cited

U.S. PATENT DOCUMENTS

| | | | |
|---|---|---|---|
| 5,027,435 A * | 6/1991 | Chraplyvy et al. | 398/187 |
| 5,649,296 A * | 7/1997 | MacLellan et al. | 455/39 |
| 5,905,372 A * | 5/1999 | Kuffner | G06K 7/0008 323/356 |
| 6,611,224 B1 * | 8/2003 | Nysen et al. | 342/42 |
| 7,155,172 B2 * | 12/2006 | Scott | 455/70 |
| 7,422,157 B2 * | 9/2008 | Smets | G01R 31/302 235/451 |
| 7,548,164 B2 | 6/2009 | Guez et al. | |
| 7,965,792 B2 * | 6/2011 | Kim et al. | 375/300 |
| 2003/0067414 A1 * | 4/2003 | Cole et al. | 343/742 |
| 2004/0203478 A1 * | 10/2004 | Scott | 455/70 |
| 2005/0034028 A1 * | 2/2005 | Son | 714/43 |
| 2005/0190098 A1 * | 9/2005 | Bridgelall et al. | 342/118 |
| 2006/0017634 A1 * | 1/2006 | Meissner | 343/742 |
| 2006/0065714 A1 * | 3/2006 | Jesme | 235/380 |
| 2006/0097874 A1 * | 5/2006 | Salesky et al. | 340/572.1 |
| 2007/0028194 A1 * | 2/2007 | Kurokawa | 716/1 |
| 2007/0075140 A1 | 4/2007 | Guez et al. | |
| 2007/0075143 A1 * | 4/2007 | Higashi | 235/451 |
| 2007/0121402 A1 * | 5/2007 | Ohshima | 365/203 |
| 2008/0137774 A1 * | 6/2008 | Kim et al. | 375/300 |
| 2008/0150814 A1 * | 6/2008 | Hedou et al. | 343/703 |
| 2008/0191031 A1 | 8/2008 | Smets et al. | |
| 2008/0237345 A1 * | 10/2008 | Moullette et al. | 235/438 |
| 2008/0290995 A1 * | 11/2008 | Bruns et al. | 340/10.1 |
| 2009/0027162 A1 * | 1/2009 | Forster | 340/10.1 |
| 2009/0115571 A1 * | 5/2009 | Bishop et al. | 340/5.61 |
| 2009/0127934 A1 * | 5/2009 | Sbuell et al. | 307/66 |
| 2009/0239478 A1 | 9/2009 | Ginggen et al. | |
| 2009/0289767 A1 * | 11/2009 | Tanaka | 340/10.1 |
| 2009/0291635 A1 * | 11/2009 | Savry | 455/41.1 |
| 2010/0102895 A1 * | 4/2010 | Beukema et al. | 332/103 |
| 2010/0156651 A1 * | 6/2010 | Broer | 340/670 |
| 2010/0167644 A1 * | 7/2010 | Winter et al. | 455/41.1 |

FOREIGN PATENT DOCUMENTS

| EP | 1717964 A2 | 11/2006 |
|---|---|---|
| EP | 1978665 A2 | 10/2008 |

OTHER PUBLICATIONS

Norm ISO/IEC 14443 "Identification cards—contacless integrated circuit(s) cards—proximity cards", Rev. 2056B-RFID-11/05.

\* cited by examiner

CARD READER DEVICE FOR CONTACTLESS READABLE CARDS AND METHOD FOR OPERATING SAID CARD READER DEVICE

BACKGROUND OF THE INVENTION

Field of the Invention

The invention relates to a method for operating a card reader for contactlessly readable cards and to a card reader of this kind.

The prior art discloses card readers and contactlessly readable cards which comprise an integrated circuit which stores information or in which information can be stored. In the case of one type of such card readers and contactlessly readable cards, the card reader produces a radio frequency magnetic field in a local area. The integrated circuit of the contactlessly readable card is connected to a reception circuit or a reception antenna, which is usually in the form of an inductor. When the contactlessly readable card is brought into the local area of the card reader, the radio frequency magnetic field induces a current in the reception circuit of the contactlessly readable card, which current is used in order to supply the integrated circuit with electric power. By modulating the radio frequency magnetic field produced, the card reader can transmit information to the contactlessly readable card, i.e. to the integrated circuit for said contactlessly readable card. The integrated circuit of the contactlessly readable card is capable of periodically connecting a load from the reception circuit in targeted fashion, which alters the radio frequency magnetic field. The card reader is designed to detect and evaluate such alterations in the magnetic field. This allows information interchange from the contactlessly readable card to the card reader.

One possible embodiment of such card readers and contactlessly readable cards is described and standardized in ISO/IEC 14443 standard "Identification cards—contactless integrated circuit (s) cards—proximity cards". The standard also refers to such contactlessly readable cards as proximity integrated circuit cards or proximity cards (PICC) for short. This standard is also taken as a basis for the operation of the identification cards standardized by the International Civil Aviation Organization—ICAO—which, by way of example, include electronic passports, electronic identification cards, etc. There are likewise credit cards which use this standard for communication. Cards for a multiplicity of further applications are possible.

The aforementioned ISO/IEC 14443 standard describes different transmission types in part 2 "radio frequency power and signal interface". A transmission type called type B involves information transmission from the card reader to the contactlessly readable card which is in the local area of the card reader being effected by virtue of a magnetic field strength of the radio frequency magnetic field produced being subjected to shift keying between an unmodulated magnetic field strength, which is associated with the letter a, and a modulated magnetic field strength, which is associated with a letter b. The unmodulated magnetic field strength and the modulated magnetic field strength are different than zero. Combinations of unmodulated and modulated magnetic field strengths represent the different symbols from the communication, from which the logic states 1 and 0 are derived. Shift keying is effected on one time base, i.e. at an information transmission frequency which—on the basis of the standard, for example—corresponds to one 128th of the carrier frequency of the radio frequency magnetic field. On the basis of the standard, the carrier frequency is stipulated as 13.56 MHz+/−7 kHz.

In order to ensure reliable signal transmission between the card reader and the contactlessly readable cards, it is necessary for the unmodulated magnetic field strength and the modulated magnetic field strength to be in a prescribed ratio with one another. For this purpose, the standard defines what is known as a modulation index m. This is obtained as the quotient of the difference between the unmodulated magnetic field strength and the modulated magnetic field strength and the sum of these two magnetic field strengths. Expressed as a formula, this means:

$$m = \frac{a-b}{a+b}$$

In order to ensure reliable recognition of the modulation signal, i.e. the transmitted information, by the contactlessly readable card, it is necessary for the modulation index to be prescribed. On the basis of the ISO/IEC 14443 standard, the modulation index is supposed to be between 8% and 14%, for example. For the identification cards standardized by the ICAO, there is even an applicable restriction to a value range from 10% to 14%. If the prescribed value for the modulation index is not observed by the card reader, this frequently results in communication with a contactlessly readable card in the local area of the card reader not being able to be executed successfully. In addition, it has been found in practice that a modulation index that is actually obtained in the radio frequency magnetic field is dependent on external influences, for example a temperature, materials in an environment of the local area, the contactlessly readable card, intrinsic parameters of the contactlessly readable card, for example on the reception circuit thereof and/or the integrated circuit thereof, i.e. a microchip, etc.

BRIEF SUMMARY OF THE INVENTION

The invention is therefore based on the technical problem of providing a card reader and a method for operating a card reader which provide a higher level of communication reliability and certainty. Communication reliability indicates a measure of whether communication between the card reader and a contactlessly readable card is achieved when the latter is in the local area of the card reader. Communication certainty is a measure of whether the information inter changed during communication is transmitted correctly.

The invention is based on the idea that communication reliability and certainty can be increased if the modulation index of the radio frequency magnetic field which is being produced corresponds as precisely as possible to the prescribed value for the modulation index when the contactlessly readable card is present in the local area of the card reader. In order to achieve this, provision is made for the modulation index which actually prevails in the magnetic field to be ascertained and for a comparison between the ascertained modulation index and a prescribed value to be taken as a basis for readjusting or controlling the production of the radio frequency magnetic field so that the modulation index obtained in the radio frequency magnetic field approaches and/or reaches the prescribed value.

In order to be able to ascertain the modulation index, it is necessary for the radio frequency magnetic field produced by the card reader to be detected in the card reader. This requires a reception inductor or reception antenna which is produced separately from a transmission antenna or inductor that is used for producing the radio frequency magnetic field. The received signal is then evaluated in order to ascertain the modulation index.

In particular, a method for operating a card reader is proposed which comprises the following steps: production of a radio frequency magnetic field in a local area of the card reader, wherein a magnetic field strength of the radio frequency magnetic field is controlled in order to execute communication with a contactlessly readable card, and wherein an information transmission from the card reader to a contactlessly readable card situated in the local area prompts the execution of amplitude shift keying modulation between two non-zero magnetic field strengths, an unmodulated magnetic field strength a and a modulated magnetic field strength b; evaluation of the radio frequency magnetic field in order to detect and analyze a variation in the radio frequency magnetic field by a contactlessly readable card situated in the local area. In this case, provision is made for the radio frequency magnetic field to be evaluated by using a reception inductors or reception antennas, which are different than a transmission antenna or a transmission inductor that is used, to receive a radio frequency magnetic field signal which is a measure of the magnetic field strength of the radio frequency magnetic field, and for the received radio frequency magnetic field signal to be used to ascertain a modulation index $m_{measured}$, wherein the modulation index m is formed as the quotient of the difference between the unmodulated magnetic field strength a and the modulated magnetic field strength b and the sum of these two magnetic field strengths a, b (m=(a−b)/(a+b)), and for the ascertained modulation index $m_{measured}$ to be compared with a prescribed modulation index $m_{prescribed}$ and for the magnetic field strengths to be customized when controlling the production of the radio frequency magnetic field in order to bring the ascertained modulation index $m_{measured}$ more into line with the prescribed modulation index $m_{prescribed}$.

It is found that, for the purpose of ascertaining the modulation index, only the relative ratio of the magnetic field strengths of the modulated and unmodulated radio frequency magnetic fields is of importance in each case. Whenever reference is made to ascertainment of the magnetic field strength in connection with the invention, this means only ascertaining a value which represents the magnetic field strength. The absolute magnetic field strength is not needed.

It is also self-evident to a person skilled in the art that the magnetic field strength of the radio frequency magnetic field oscillates at the carrier frequency of the radio frequency magnetic field. The received radio frequency magnetic field signal in turn oscillates at the frequency of the radio frequency magnetic field. By way of example, a peak-to-peak value for the amplitude of the radio frequency magnetic field signal is a measure of the magnetic field strength of the oscillating radio frequency magnetic field. The radio frequency magnetic field signal can therefore be considered to be a measure of the magnetic field strength of the radio frequency magnetic field.

In addition, a card reader for communicating with a contactlessly readable card in a local area of the card reader is provided which comprises: a controllable transmission unit for producing a radio frequency magnetic field in a local area of the card reader, wherein a magnetic field strength of the radio frequency magnetic field can be controlled in order to execute communication with the contactlessly readable card, and wherein the transmission unit is designed to execute amplitude shift keying modulation between two non-zero magnetic field strengths, an unmodulated magnetic field strength a and a modulated magnetic field strength b, for an information transmission from the card reader to a contactlessly readable card situated in the local area; and an evaluation unit for evaluating the radio frequency magnetic field in order to detect and analyze a variation in the magnetic field by a contactlessly readable card situated in the local area. The card reader comprises a reception inductor or reception antenna, which is different than a transmission antenna or transmission inductor that is used for producing the radio frequency magnetic field, for receiving a radio frequency magnetic field signal which is a measure of the magnetic field strength of the radio frequency magnetic field, wherein the reception inductor or reception antenna is linked to the evaluation unit. The evaluation unit comprises a detection circuit which ascertains a value representing the current received magnetic field strength and supplies it to a control unit. The control unit is designed to ascertain a modulation index $m_{measured}$, wherein the modulation index m is defined as the quotient of the difference between the unmodulated magnetic field strength a and the modulated magnetic field strength b and the sum of these two magnetic field strengths a, b (m=(a−b)/(a+b)). The control unit is also designed to compare the ascertained modulation index $m_{measured}$ with a prescribed modulation index $m_{prescribed}$ and to actuate the transmission unit in order to bring the ascertained modulation index $m_{measured}$ more into line with the prescribed modulation index $m_{prescribed}$. If the unmodulated magnetic field strength is associated with a maximum magnetic field strength, and the modulated magnetic field strength is associated with a non-zero lowered magnetic field strength, the lowered magnetic field strength is reduced if the ascertained modulation index $m_{measured}$ is less than the prescribed value of the modulation index $m_{prescribed}$. Accordingly, the modulated magnetic field strength is raised if the ascertained modulation index $m_{measured}$ is greater than a prescribed value for the modulation index $m_{prescribed}$.

A current magnetic field strength for the radio frequency magnetic field is dependent on ambient conditions, particularly a temperature of the card reader or of the electronics contained therein and/or a nature and/or orientation of a contactlessly readable card situated in the local area. Hence, the modulation index is also dependent on these ambient conditions.

By virtue of the modulation index being readjusted such that the modulation index which actually exists in the radio frequency magnetic field corresponds as exactly as possible to the prescribed modulation index or is within a prescribed or prescribable tolerance range around it, it is possible to ensure that the contactlessly readable card receives the information transmitted by the card reader more reliably. This ensures that, regardless of changing local conditions or differing intrinsic parameters for the contactlessly readable card, communication can be executed in each case. In particular, this produces a communication time which is needed in order to execute communication when data are read from the contactlessly readable card, since a number of unsuccessful communication attempts is greatly reduced. Particularly in the case of contactlessly readable cards whose intrinsic parameters differ from standard values or which, in combination with unfavorable ambient conditions, result in a discrepancy from the standard, the readjustment of the modulation index which is proposed in this case means that it is possible to execute communications which might otherwise be impossible. At border posts, this can significantly speed up border clearance, since single passports in the form of contactlessly readable cards are read more quickly. Furthermore, it is possible to read a greater number of electronic identification documents even under unfavorable ambient conditions and/or fluctuating ambient conditions. This increases a total throughput for a checkpoint which is equipped with a card reader. In addition, certainty of the check is increased, since the number of electronic identification documents which cannot be read at all is significantly lowered.

Overall, an examination process for a personal check, involving information being read from a contactlessly readable card using a card reader, is therefore speeded up.

In one preferred embodiment, the radio frequency magnetic field signal received via the reception antenna or reception inductor is also used to supply said signal to a demodulation unit in an evaluation unit in order to determine therefrom an alteration in the magnetic field in those intervals of time in which the contactlessly readable card uses a change of load to modulate the radio frequency magnetic field and, by this means, to transmit a piece of information to the card reader. In other embodiments, this received signal is tapped off for the demodulation on the transmission antenna or transmission inductor, as is currently customary in the prior art.

Preferably, some embodiments involve the communication between the card reader and the contactlessly readable card being executed at least on a physical level on the basis of the ISO/IEC 14443 standard. On the basis of this, it is possible to implement different communication standards.

In one preferred embodiment, a separate customization sequence is executed in which there is controlled iterative shift keying between the unmodulated magnetic field strength a and the modulated magnetic field strength b, and the modulated magnetic field strength and/or the unmodulated magnetic field strength are varied, in each case on the basis of the comparison between the ascertained modulation index $m_{measured}$ and the prescribed modulation index $m_{prescribed}$, in order to prompt the ascertained modulation index $m_{measured}$ to be brought more into line with the prescribed modulation index $m_{prescribed}$. This provides the option of prompting optimum customization of the modulation index or the readjustment thereof at suitable times.

In one preferred embodiment, the control unit is designed such that it controls the entire communication between the card reader and the contactlessly readable card. This means that the control unit also executes programs on high communication levels on the basis of an OSI model.

In one development of the invention, the customization sequence is terminated if a discrepancy between the ascertained modulation index $m_{measured}$ and the prescribed modulation index $m_{prescribed}$ is within a tolerance range or a prescribed number of iterations is executed. The tolerance range may have been stipulated symmetrically or asymmetrically around the prescribed value of the modulation index. Termination after a particular number of iterations is advantageous, since this ensures that the customization sequence is terminated in all cases, including when unfavorable circumstances mean that optimum customization of the modulation index is not possible. The tolerance range can also be varied, for example if optimum customization has not been achieved in a few iteration steps.

In one embodiment, the iterative shift keying between the unmodulated magnetic field strength a and the modulated magnetic field strength b during the customization sequence is performed at a customization sequence shift keying frequency which differs from a frequency, preferably differs by at least one order of magnitude, which is used for shift keying for the information transmission between the card reader and the contactlessly readable card. This ensures that the amplitude shift keying during the customization sequence is not regarded as information transmission from the card reader to the contactlessly readable card. With particular preference, the customization sequence shift keying frequency used is less than a signal transmission frequency, i.e. a frequency at which single bits are transmitted from the card reader to the contactlessly readable card.

In one embodiment, the customization sequence is executed during a transmission of information between the card reader and the contactlessly readable card, with the information transmission being interrupted for this purpose. This makes it possible to ensure that in the case of relatively long-lasting communication processes the modulation index is readjusted optimally in each case, even if the ambient conditions have changed as a result of alteration of the distance between the contactlessly readable card and the card reader in the local area, for example.

In order to prevent the contactlessly readable card from possibly interpreting the shift keying of the magnetic field strength during a customization sequence as an information transmission and from attempting to respond thereto, the customization sequence is—in one embodiment—executed immediately before the radio frequency magnetic field is switched off. Such switching-off of the radio frequency magnetic field is executed by card readers normally at regular intervals, particularly after unsuccessful polling sequences, in order to ensure that a contactlessly readable card situated in a local area or the microchip contained in said card is deactivated and, as a result, reset to a defined state. Hence, in some embodiments, the customization sequence is executed only or at least also after unsuccessful polling sequences before the radio frequency magnetic field is switched off. This ensures that the modulation index is readjusted in optimized fashion, so that after the microprocessor in the contactlessly readable card has been reset there is an optimum modulation ratio at the beginning of a subsequent polling sequence, so that the probability of successful communication between the card reader and the contactlessly readable card is significantly increased.

It is likewise advantageous to execute a customization sequence after an examination which is used to check whether the contactlessly readable card continues to be in the local area, for example when no information has been interchanged between the card reader and the contactlessly readable card for a certain interval in time in a communication process, for example, and to execute this customization sequence before the information interchange is continued. This again readjusts the modulation index in optimized fashion for the subsequent information interchange. If a relatively large volume of data is read from the contactlessly readable card in the subsequent information interchange, for example, then this can be used to ensure that there is a relatively high probability of this reading being executed completely and correctly and not having to be performed again, which would be the case if the modulation index is nonoptimum and, as a result, a mistransmission or a terminated transmission were to occur.

The evaluation unit in a preferred card reader comprises a measuring circuit for ascertaining values $a_{measured}$, $b_{measured}$ representing the received magnetic field strengths for the purpose of calculating the measured modulation index $m_{measured}$, wherein the measuring circuit determines the values $a_{measured}$, $b_{measured}$ representing the magnetic field strengths from the received radio frequency magnetic field signal (60), so that said values represent a magnetic field strength that is averaged over time.

In one preferred embodiment, the measuring circuit comprises a detection circuit having a downstream analog/digital converter, wherein the detection circuit comprises a low-pass circuit for ascertaining an effective value, particularly an rms value. Averaging is necessary, since the radio frequency magnetic field signal constantly oscillates at the radio frequency of the radio frequency magnetic field. Averaging over time provides a measure of an envelope for the radio frequency magnetic field signal, which measure in turn represents the amplitude of the magnetic field strength with which the radio frequency magnetic field oscillates.

The analog/digital converter is used to digitize the amplitude value ascertained in this manner and to provide it to the control device, which controls the controlled transmission unit as appropriate in order to customize the magnetic field strengths.

It has been found to be particularly advantageous to design the measuring circuit such that it evaluates positive and negative half-cycles of the received radio frequency magnetic field signal separately. The control unit can then evaluate the magnetic field strengths ascertained for the negative and positive half cycles. This means that there is no longer any dependency on a common mode component in the measured radio frequency magnetic field signal.

In one preferred embodiment of a card reader, a modulation circuit in the transmission unit with a demodulation circuit in the evaluation unit are integrated in an integrated controllable circuit, wherein the magnetic field strengths produced can be controlled by means of register values for output resistances which can be set by means of control commands from the control unit. An integrated circuit of this kind therefore executes the modulation and demodulation for the communication from the card reader to the contactlessly readable card and from the contactlessly readable card to the card reader. This communication is controlled by the control unit, which firstly stipulates the information and the magnetic field strengths used in this context for a transmission to the contactlessly readable card and secondly evaluates the received information which is obtained from the demodulation.

The invention is explained in more detail below with reference to a drawing, in which:

DESCRIPTION OF THE INVENTION

Figure 1:
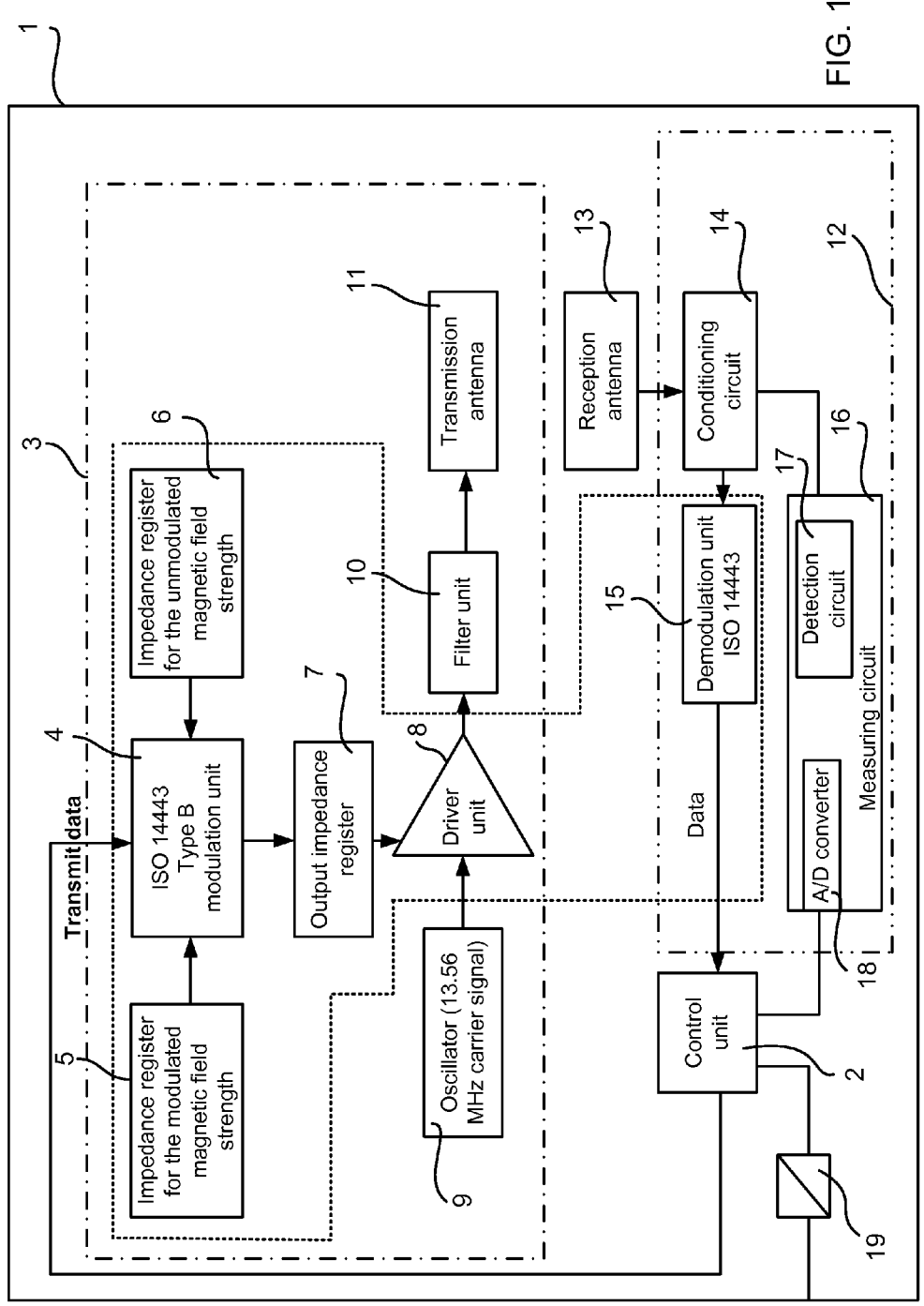
FIG. 1 shows a schematic illustration of an embodiment of a card reader.

FIG. 1 schematically shows a card reader 1. The card reader 1 comprises a control unit 2 which controls a manner of operation of the card reader 1. The control unit 2 usually comprises a microprocessor, a memory and software stored therein which can be executed on the microprocessor. These subcomponents of the control unit 2 are not shown for reasons of simplification. The control unit is designed to control a transmission unit 3, which is shown by a dash-dot line. The transmission unit 3 is designed such that it can produce a radio frequency magnetic field in a local area of the card reader 1. In addition, the transmission unit 3 is designed such that it can, under the control of the control unit 2, execute amplitude shift keying modulation of the magnetic field strength for the purpose of transmitting information. The transmission unit 2 comprises a modulation unit 4 for this purpose. The modulation unit 4 is preferably designed such that it can execute modulation of the signal on the basis of the ISO/IEC 14443 type B standard. In some embodiments, the modulation unit 4 may also be designed such that it can, under the control of the control unit 2, also execute other modulation methods. In order to be able to influence an unmodulated magnetic field strength a and a modulated magnetic field strength b, the embodiment shown has an impedance register provided for the modulated magnetic field strength 5 and an impedance register provided for the unmodulated magnetic field strength 6. Using the values which can be stipulated by means of the control unit 2, the modulation unit 4 sets a value for an output impedance register 7 on the basis of the modulation. The value of the output impedance register 7 stipulates the output impedance of a driver unit 8. The latter amplifies a signal from an oscillator 9, which oscillates at a carrier frequency, for example 13.56 MHz, and produces a transmission signal. The transmission signal is sent to a transmission antenna 11 via a filter unit 10. The transmission antenna 11 is preferably in the form of a transmission inductor with a conductor loop.

In the prior art, a conditioning circuit is additionally used to tap off a received signal from the transmission antenna, said received signal being able to be used to detect a variation in the produced radio frequency magnetic field by a contactlessly readable card (not shown) in the local area of the card reader during information transmission from the contactlessly readable card to the card reader.

In the case of the embodiment shown in this case, an evaluation unit 12 is provided which is shown by a dash-double-dot line. The evaluation unit 12 is coupled to a reception antenna 13, which is preferably in the form of a reception inductor with a conductor loop. The radio frequency magnetic field signal induced by the radio frequency magnetic field which is produced by the transmission unit 3 is conditioned for further processing by means of a conditioning circuit 14 in the evaluation unit 12. This received radio frequency magnetic field signal can firstly be supplied to a demodulation unit 15, which performs demodulation on the basis of the ISO/IEC 14443 type B standard and outputs the received information to the control unit in the form of data. In addition, the conditioned received radio frequency magnetic field signal is supplied to a measuring circuit 16, which ascertains the values representing a respective current magnetic field strength for the radio frequency magnetic field. It is self-evident to a person skilled in the art that the magnetic field strength of the radio frequency magnetic field oscillates at the carrier frequency of the radio frequency magnetic field. The radio frequency magnetic field signal in turn oscillates at the frequency of the radio frequency magnetic field. A peak-to-peak value for the amplitude of the radio frequency magnetic field signal is a measure of the magnetic field strength of the radio frequency magnetic field. The radio frequency magnetic field signal can therefore be considered to be a measure of the magnetic field strength of the radio frequency magnetic field. The measuring circuit 16 ascertains a respective current value representing the magnetic field strength using the radio frequency magnetic field signal. To this end, the voltage of the received radio frequency magnetic field signal is analyzed. Since amplitude shift keying is performed at a frequency which is lower than the carrier frequency of the radio frequency magnetic field, the magnetic field strength can be ascertained by averaging one or more half cycles of the induced magnetic field signal over time. As explained further below, it is advantageous for the positive and negative half-cycles both to be evaluated separately in each case. A detection circuit 17 executes such averaging, for example. This circuit is preferably in the form of an analog circuit. A downstream analog/digital converter 18 provides the values for the ascertained magnetic field strengths for the control unit 2. The latter is designed to use the received values to determine a measured modulation index from the values which have been measured while the radio frequency magnetic field is unmodulated and modulated. The ascertained modulation index $m_{measured}$ is compared with a prescribed modulation index $m_{prescribed}$. The comparison is advantageously executed such that a check is performed to determine whether the measured modulation index $m_{measured}$ is within a tolerance range about the prescribed modulation index. This tolerance range can, but does not need to, be of symmetrical design. If the ascertained modulation index is not within the tolerance range about the prescribed modulation index, the control unit 2 changes the prescribed values in the impedance register for the modulated magnetic field strength 5 and/or in the impedance register for the unmodulated magnetic field strength 6.

The prescribed values for the modulation index and for the limiting values of the tolerance range $\delta t_1$, $\delta t_2$ may be firmly prescribed or, in the case of some embodiments, detected or input via an interface 19. The interface 19 can likewise be used to interchange data which need to be transmitted to the contactlessly readable card or which have been received therefrom. The interface 19 may be a communication interface or a user interface which, for example, is in the form of a terminal, a touchscreen with a graphical user interface, etc.

By virtue of a suitable selection of the measuring circuit 16 or detection circuit 17, it is possible to achieve the effect that the modulation index is readjusted or controlled during a communication process in which data are transmitted to the contactlessly readable card. In other embodiments, however, provision is made for a customization sequence to be executed as an alternative or in addition.

In preferred embodiments, the modulation and demodulation and also the signal generation for a transmission signal are executed in an integrated chip 20. Said chip is indicated by a dotted line. In other embodiments, it is also possible for the measuring circuit 17 to be integrated in the chip 20 at the same time. In such a case, the functionality of the readjustment of the modulation index can also be transferred from the control unit to the chip. In another embodiments, the signal for the demodulation is tapped off not from the reception antenna but rather from the transmission antenna. For this purpose, a separate conditioning circuit may be provided. In yet other embodiments, the conditioning circuit 14 between the reception antenna 13 and the measuring circuit 16 and/or the demodulation unit 15 can be dispensed with.

Figure 2:
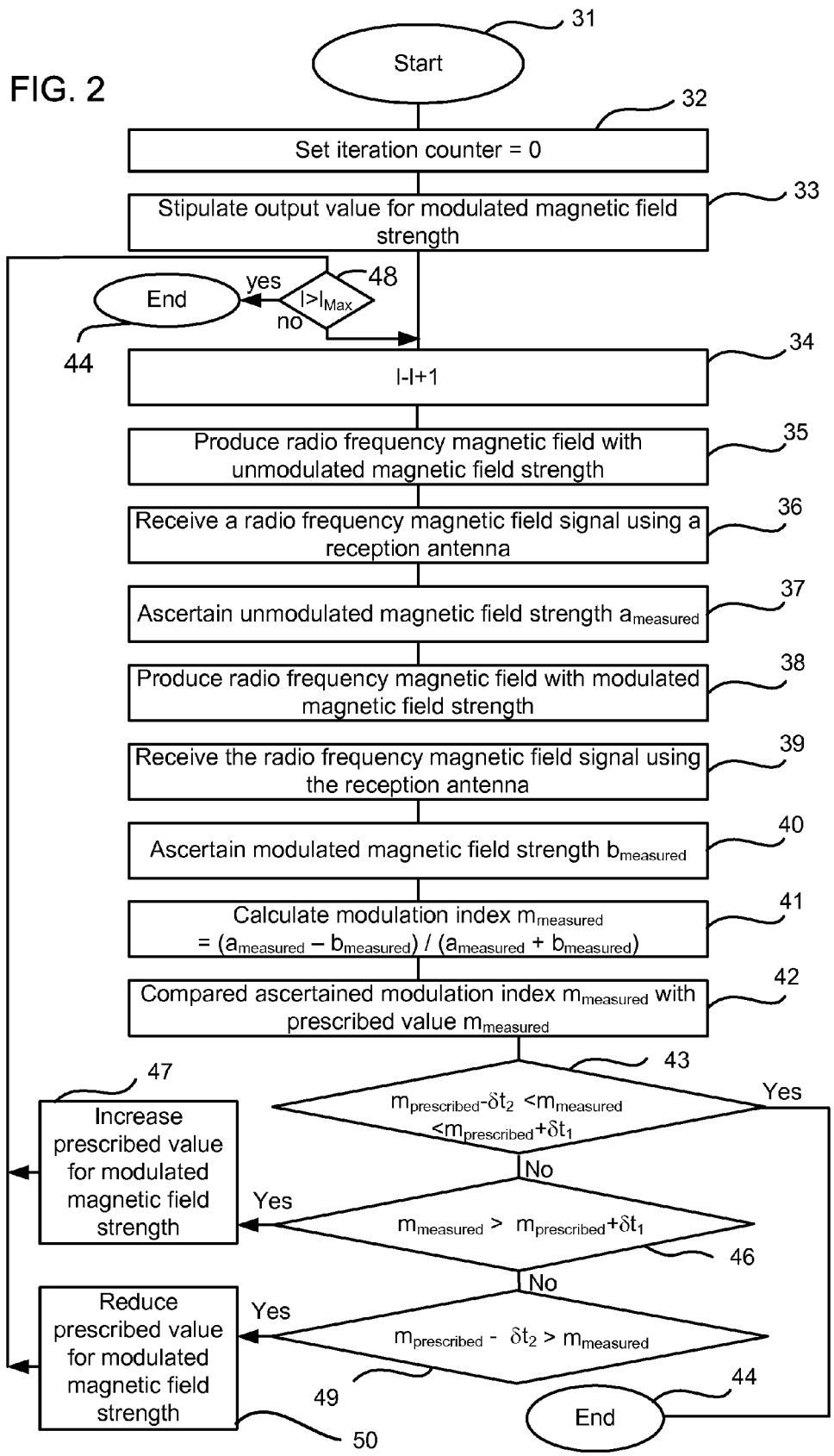
FIG. 2 shows a schematic flowchart for a customization sequence.

FIG. 2 shows a schematic flowchart for a possible embodiment of a customization sequence. The customization sequence starts with function block 31 Start. First of all, an iteration counter I is set to the value 0 32. Next, an initial value is stipulated for the modulated magnetic field strength 33. By way of example, this can be done by writing to the impedance register for the modulated magnetic field strength 5 as in the case of the embodiment shown in FIG. 1. The initial value can be regarded as a prescribed value for controlling the modulated magnetic field strength. Next, the iteration counter is incremented 34. For an intervaled time, the radio frequency magnetic field with the unmodulated magnetic field strength a is then produced. A reception antenna is used to receive the radio frequency magnetic field signal induced by the radio frequency magnetic field 36. For this, a value $a_{measured}$ representing the received unmodulated magnetic field strength a is ascertained 37. Next, the magnetic field with the modulated magnetic field strength b is produced 38. Again, the reception antenna is used to received the now modulated radio frequency magnetic field signal 39. From this, a further value $b_{measured}$ representing the modulated magnetic field strength b is ascertained 40. Next, the modulation index $m=(a_{measured}-b_{measured})/(a_{measured}+b_{measured})$ is determined 41. Next, the measured modulation index $m_{measured}$ is compared with the prescribed value of the modulation index $m_{prescribed}$ 42. A test 43 is used to check whether the measured modulation index is within a tolerance range which is stipulated by the tolerance limit values $\delta t_2$ and $\delta t_1$, i.e. whether the measured modulation index is in a range between $m_{prescribed}-\delta t_2$ and $m_{prescribed}+\delta t_1$. If this is the case then the customization sequence is terminated 44. If the measured modulation index is not within the prescribed tolerance range, the test 45 checks whether the measured modulation index is greater than the prescribed modulation index plus a first tolerance limit $\delta t_1$ 46. If this is the case then the prescribed value for controlling the modulated magnetic field strength is increased, i.e. an output impedance is lowered 47. Next, a test 48 is used to test whether a maximum number of iterations has been reached. If this is the case then the customization method is terminated 44. Otherwise, the method is executed again from the step of incrementing the number of iterations 34.

If the test to determine whether the measured modulation index is greater than the prescribed value plus the first $\delta t_1$ tolerance limit 46 establishes that this is not the case then a test 49 is used to check whether the measured modulation index is less than the prescribed value minus the second tolerance limit $\delta t_2$ 49. This method step is inserted only for the sake of further clarity and can be omitted in a real method. If this is the case, the prescribed value for controlling the modulated magnetic field strength is reduced, i.e. the output resistance of the driver unit 8 shown in FIG. 1 is increased 50. Next, the method is continued with the test 48 to determine whether a maximum number of iterations has been reached.

Figure 3:
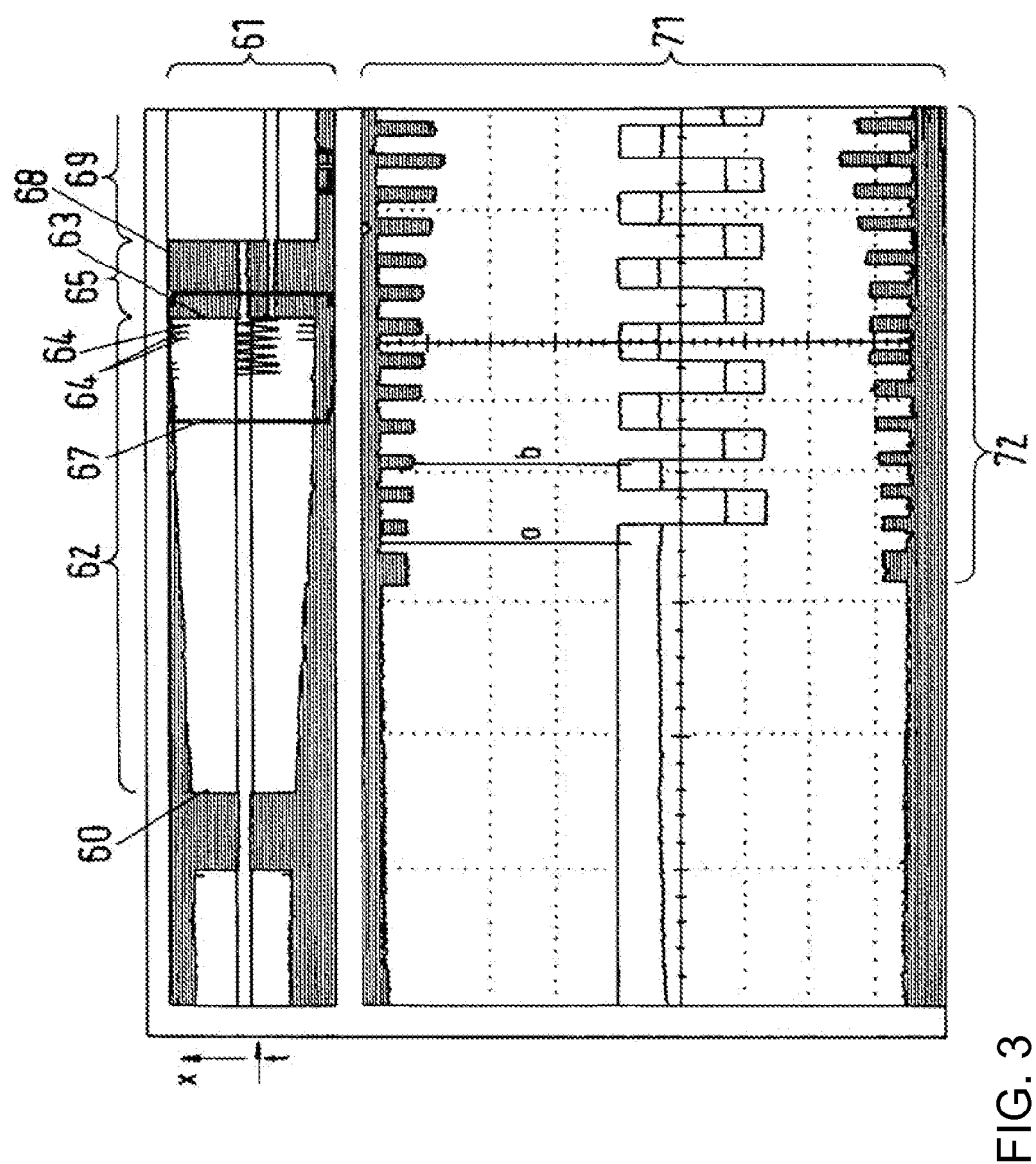
FIG. 3 shows a schematic view of a visualization of a measured magnetic field strength.

FIG. 3 shows a view of an oscillograph which is a graphical representation of the received radio frequency magnetic field signal 60 against time. A small overview window 61 shows a polling sequence 62. During the polling sequence 62, the ambient conditions are altered, so that a magnetic field strength x increases with time t. As a result, it can be seen that the magnetic field strength can be altered on the basis of ambient conditions in the local area of the card reader. The individual oscillations in the radio frequency magnetic field are not resolved. Similarly a signal transmission taking place from the card reader to the contactlessly readable card is not discernable, since a period of time for the sections in which the amplitude is shift keyed to a modulated value cannot be resolved over time on account of the shift keying frequency of the signal transmission, i.e. a signal transmission frequency. At the end 63 of the polling sequence 62, however, it is possible to identify "notches" 64 in an envelope for the received radio frequency magnetic field signal 60 before the radio frequency magnetic field 60 is switched off completely for an interval of time 65.

The lower portion 71 of the oscillograph view shows an enlarged representation of the area of the overview window 61 which is bounded by parentheses 66, 67. What is shown is the magnetic field signal 60 during a customization sequence 72. It can clearly be seen that the magnetic field strength is subjected to iterative shift keying between the unmodulated magnetic field strength a and the modulated magnetic field strength b. This is done at a customization sequence shift keying frequency. This frequency is very much lower than the signal transmission sequence, which means that the shift keying operations of the customization sequence 72 can be presented in a manner resolved over time. It can clearly be seen that the modulated magnetic field strength is lowered in steps, as a result of which the modulation index rises. When the desired modulation index has been exceeded in a penultimate shift keying step, the modulated magnetic field strength is raised slightly again. The measured modulation index $m_{measured}$ is now within the tolerance range about the prescribed value of the modulation index $m_{prescribed}$. The customization sequence 72 is then terminated.

The customization sequence can advantageously be executed at the end of a polling sequence 62 by virtue of no communication with a contactlessly readable card having been able to be set up in the local area of the card reader. This ensures that chances of successful communication setup are improved at the start of a subsequent polling sequence 69 (c.f. overview window 61 from FIG. 3). It may likewise be advantageous to perform such a customization sequence 72 in the course of a communication in which, by way of example, intervals of time arise between information interchange sequences, during which intervals of time the card reader processes read-in information on a relatively high level in the OSI model, for example, or awaits information from an external source before further data are to be read from the contactlessly readable card.

Figure 4:
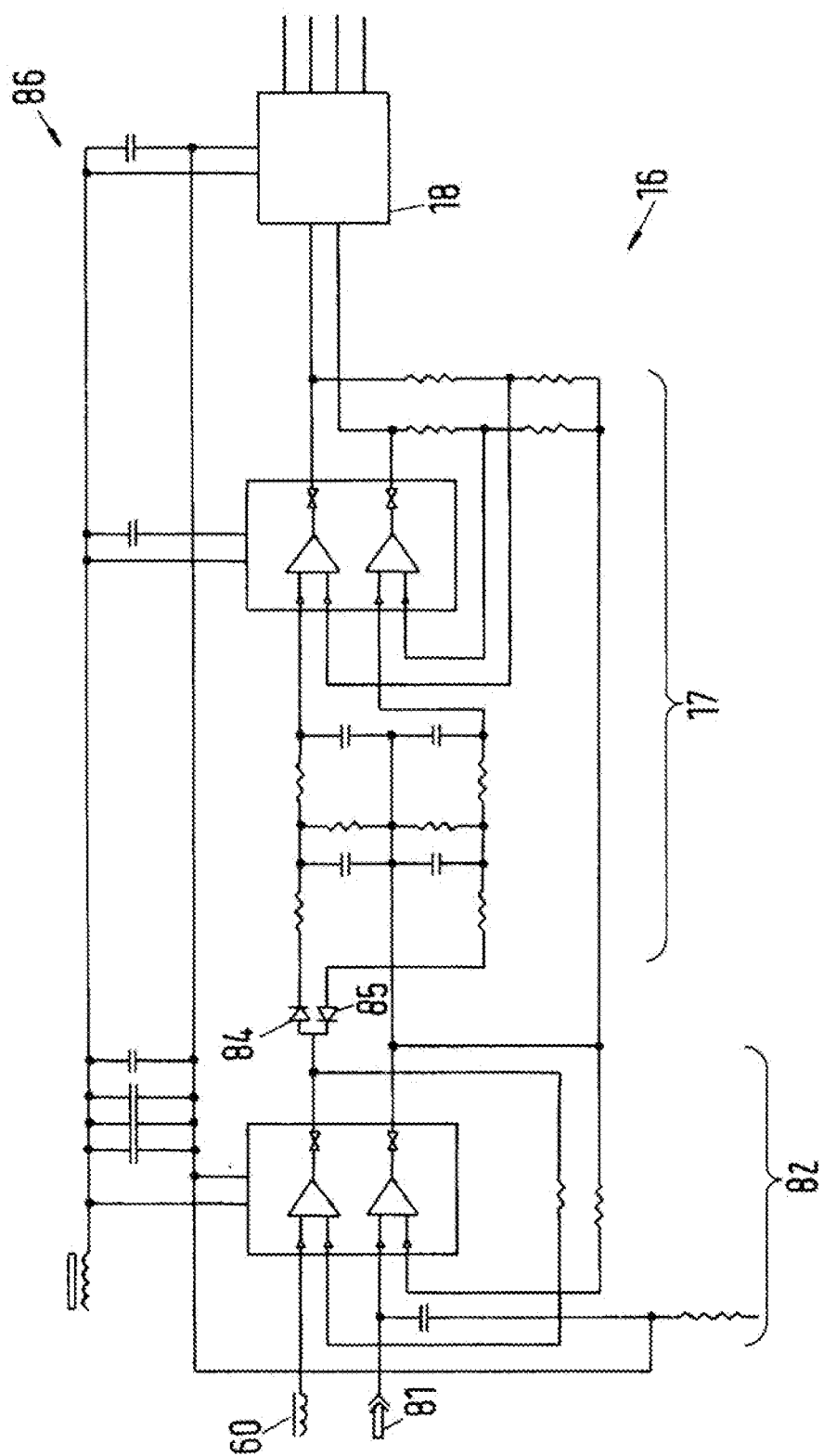
FIG. 4 shows a schematic illustration of a measuring circuit.

FIG. 4 shows an exemplary measuring circuit in schematic form. The received radio frequency magnetic field signal 60 is supplied together with a reference potential 81 to a preamplifier unit 82. Next, the positive and negative half cycles of the radio frequency magnetic field signal are separated using diodes 84, 85. A detection circuit 17 is in the form of an integrating low-pass filter. The signal from the detection circuit is then subsequently passed to an analog/digital converter 18 which forwards the thus ascertained values to the control unit. By virtue of the positive and negative half cycles being evaluated separately, it is possible for the amplitude to be reliably determined regardless of whether the reference potential matches the potential value about which the radio frequency magnetic field signal 60 oscillates symmetrically on a periodic basis. The top area of FIG. 4 indicates a power supply 86.

It is self-evident to a person skilled in the art that only exemplary embodiments have been described. Departures are possible both in terms of the hardware and in terms of the order of the method steps.

LIST OF REFERENCE SYMBOLS

1 Card reader
2 Control unit
3 Transmission unit
4 Modulation unit
5 Impedance register for the modulated magnetic field strength
6 Impedance register for the unmodulated magnetic field strength
7 Output impedance register
8 Driver unit
9 Oscillator
10 Filter unit
11 Transmission antenna
12 Evaluation unit
13 Reception antenna
14 Conditioning circuit
15 Demodulation unit
16 Measuring circuit
17 Detection circuit
18 A/D converter
19 Interface
20 Integrated chip
31-50 Method steps
60 Radio frequency magnetic field signal
61 Overview window
62 Polling sequence
63 End
64 Notches
65 Interval of time
66, 67 Parentheses
69 Subsequent polling sequence
71 Lower portion
72 Customization sequence
81 Reference potential
82 Preamplifier unit
84, 85 Diodes
86 Power supply

The invention claimed is:

1. A method of operating a card reader to perform a separate customization sequence to improve communication between the card reader and a contactlessly readable card situated in a local area of the card reader, which comprises steps of:
    producing a radio frequency magnetic field in the local area of the card reader, a magnetic field strength of the radio frequency magnetic field is controlled in order to execute communication with the contactlessly readable card, and an information transmission from the card reader to the contactlessly readable card situated in the local area prompts an execution of amplitude shift keying modulation between two non-zero magnetic field strengths, an unmodulated magnetic field strength a and a modulated magnetic field strength b;
    evaluating the radio frequency magnetic field with unmodulated magnetic field strength and the radio frequency magnetic field with modulated magnetic field strength for detecting and analyzing a variation in the radio frequency magnetic field by the contactlessly readable card situated in the local area;
    evaluating the radio frequency magnetic field with the unmodulated magnetic field strength and the radio frequency magnetic field with the modulated magnetic field strength using one of a reception inductor or reception antenna, which is different than a transmission inductor or a transmission antenna that is used, to receive the radio frequency magnetic field signal with the unmodulated magnetic field strength and the radio frequency magnetic field with the modulated magnetic field strength and ascertaining a modulation index $m_{measured}$, the modulation index $m_{measured}$ is formed as a quotient of a difference between the unmodulated magnetic field strength $a_{measured}$ and the modulated magnetic field strength $b_{measured}$ and a sum of the two magnetic field strengths $a_{measured}$, $b_{measured}$ ($m_{measured}$ = ($a_{measured} - b_{measured}$)/($a_{measured} + b_{measured}$)); wherein the $a_{measured}$ represents the radio frequency magnetic field with the unmodulated magnetic field strength and the $b_{measured}$ represents the radio frequency magnetic field with the modulated magnetic field strength for calculating the modulation index $m_{measured}$ using a detection circuit of the card reader and wherein the detection circuit determines the values $a_{measured}$, $b_{measured}$ representing the magnetic field strengths from the received radio frequency magnetic field signal, so that the values represent the radio frequency magnetic field strength that is averaged over time for the communication between the card reader and the contactlessly readable card;

comparing the modulation index $m_{measured}$ ascertained with a prescribed modulation index $m_{prescribed}$;

customizing the magnetic field strengths when controlling a production of the radio frequency magnetic field in order to bring the modulation index $m_{measured}$ more into line with the prescribed modulation index $m_{prescribed}$; and executing the separate customization sequence iteratively which includes substeps of:

performing the amplitude shift keying between the unmodulated magnetic field strength a and the modulated magnetic field strength b, and varying at least one of the modulated magnetic field strength or the unmodulated magnetic field strength, in each case on a basis of a comparison between the modulation index $m_{measured}$ ascertained and the prescribed modulation index $m_{prescribed}$, in order to prompt the ascertained modulation index $m_{measured}$ to be brought more into line with the prescribed modulation index $m_{prescribed}$.

2. The method according to claim 1, which further comprises configuring the card reader to execute communication on a basis of an ISO/IEC 14443 standard.

3. The method according to claim 1, which further comprises evaluating and readjusting a transmission signal to customize the modulation index $m_{measured}$ to suit the prescribed modulation index before the radio frequency magnetic field is switched off at an end of an unsuccessful polling sequence or when the radio frequency magnetic field is switched off.

4. The method according to claim 1, which further comprises terminating the customization sequence if a discrepancy between the ascertained modulation index $m_{measured}$ and the prescribed modulation index $m_{prescribed}$ is within a tolerance range or a prescribed number of iterations is executed.

5. The method according to claim 1, wherein the iterative shift keying between the unmodulated magnetic field strength a and the modulated magnetic field strength b during the separate customization sequence takes place at a customization sequence shift keying frequency which differs from a frequency, by at least one order of magnitude, which is used for shift keying for the information transmission between the card reader and the contactlessly readable card.

6. The method according to claim 1, which further comprises executing the separate customization sequence during a transmission of information between the card reader and the contactlessly readable card in transmission pauses.

7. The method according to claim 1, which further comprises executing the separate customization sequence after a check to determine whether the contactlessly readable card continues to be in the local area before the information interchange is continued.

8. A card reader for performing a separate customization to improve communicating with a contactlessly readable card in a local area of the card reader, the card reader comprising:

a controllable transmission unit for producing a radio frequency magnetic field in the local area of the card reader, a magnetic field strength of the radio frequency magnetic field can be controlled to execute communication with the contactlessly readable card, said controllable transmission unit configured to execute amplitude shift keying modulation between two non-zero magnetic field strengths, including an unmodulated magnetic field strength a and a modulated magnetic field strength b, for an information transmission from the card reader to the contactlessly readable card situated in the local area;

an evaluation unit for evaluating the radio frequency magnetic field with unmodulated magnetic field strength and the radio frequency magnetic field with modulated magnetic field strength to detect and analyze a variation in the magnetic field by the contactlessly readable card situated in the local area;

a reception unit selected from the group consisting of a reception antenna and a reception inductor, which is different than a transmission antenna or a transmission inductor that is used for producing the radio frequency magnetic field, said reception unit receiving the radio frequency magnetic field signal with the unmodulated magnetic field strength and the radio frequency magnetic field with the modulated magnetic field strength and linked to said evaluation unit;

a control unit;

said evaluation unit having a detection circuit for ascertaining a received magnetic field strength and supplies it to said control unit configured to ascertain a modulation index $m_{measured}$, the modulation index $m_{measured}$ being defined as a quotient of a difference between the unmodulated magnetic field strength $a_{measured}$ and the modulated magnetic field strength $b_{measured}$ and a sum of the two magnetic field strengths $a_{measured}$, $b_{measured}$ ($m_{measured} = (a_{measured} - b_{measured})/(a_{measured} + b_{measured})$), and to compare an ascertained modulation index $m_{measured}$ with a prescribed modulation index $m_{prescribed}$ and to actuate said controllable transmission unit to bring the ascertained modulation index $m_{measured}$ more into line with the prescribed modulation index $m_{prescribed}$; and said control unit executing the separate customization sequence iteratively which includes the steps of:

subjecting an amplitude of a magnetic field to shift keying between the unmodulated magnetic field strength a and the modulated magnetic field strength b, and varying at least one of the modulated magnetic field strength b or the unmodulated magnetic field strength, in each case on a basis of a comparison between the ascertained the ascertained modulation index $m_{prescribed}$ to be brought more into line with the prescribed modulation index $m_{prescribed}$;

wherein said evaluation unit has a measuring circuit for measuring the $a_{measured}$ represents the radio frequency magnetic field with the unmodulated magnetic field strength and the $b_{measured}$ represents the radio frequency magnetic field with the modulated magnetic field strength for calculating the modulation index $m_{measured}$ using the detection circuit of the card reader and wherein said measuring circuit determines the values $a_{measured}$, $b_{measured}$ representing the magnetic field strengths from the received radio frequency magnetic field signal, so that the values represent a magnetic field strength that is averaged over time.

9. The card reader according to claim 8, wherein the card reader executes communication on a basis of an ISO/IEC 14443 standard.

10. The card reader according to claim 8, wherein said control unit is configured to evaluate and customize a controller in order to customize the ascertained modulation index $m_{measured}$ to suit the prescribed modulation index $m_{prescribed}$ before the radio frequency magnetic field is switched off, including at an end of an unsuccessful polling sequence.

11. The card reader according to claim 8, wherein said control unit terminates the customization sequence if a discrepancy between the ascertained modulation index $m_{measured}$ and the prescribed modulation index $m_{prescribed}$ or a prescribed number of iterations is executed.

12. The card reader according to claim 8, wherein said control unit controls the iterative shift keying between the unmodulated magnetic field strength a and the modulated magnetic field strength b during the customization sequence at the separate customization sequence shift keying frequency which differs from a frequency, which is used for shift keying for the information transmission between the card reader and the contactlessly readable card.

13. The card reader according to claim 12, wherein said control unit executes the separate customization sequence during the information transmission between the card reader and the contactlessly readable card in transmission pauses.

14. The card reader according to claim 12, wherein the separate customization sequence shift keying frequency differs from the frequency by at least one order of magnitude.

15. The card reader according to claim 8, wherein said measuring circuit has the detection circuit with a downstream analog/digital converter, wherein said detection circuit has a low-pass circuit for ascertaining an effective value.

16. The card reader according to claim 8, wherein said measuring circuit evaluates positive and negative half-cycles of the received radio frequency magnetic field signal separately.

17. The card reader according to claim 8, wherein:
said transmission unit has a modulation circuit;
said evaluation unit has a demodulation circuit, said modulation circuit in said transmission unit with said demodulation circuit in said evaluation unit are integrated in an integrated controllable circuit, wherein the magnetic field strengths produced can be controlled by means of register values for output resistance values which can be set by means of control commands from said control unit.

* * * * *